W. MELSHEIMER.
Cooking Stove.
No. 1,911. Patented Dec. 17, 1840.
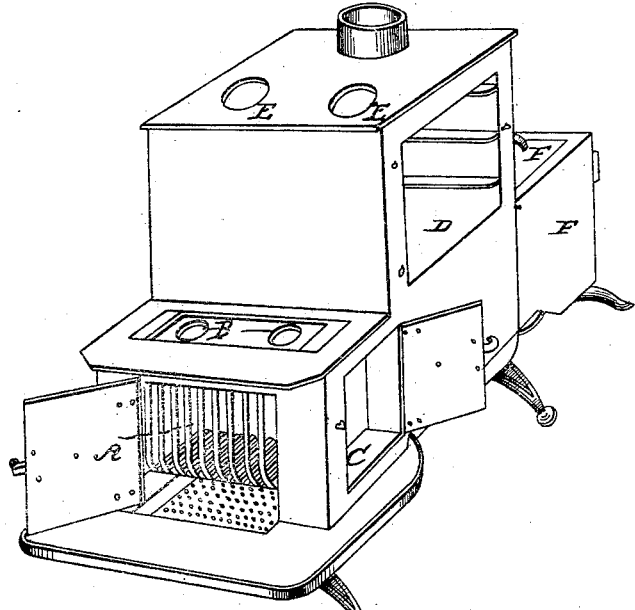
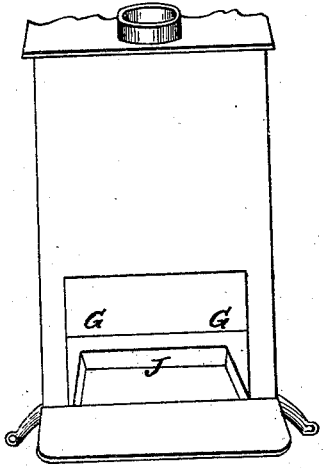
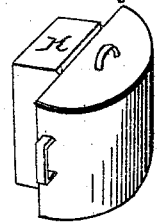
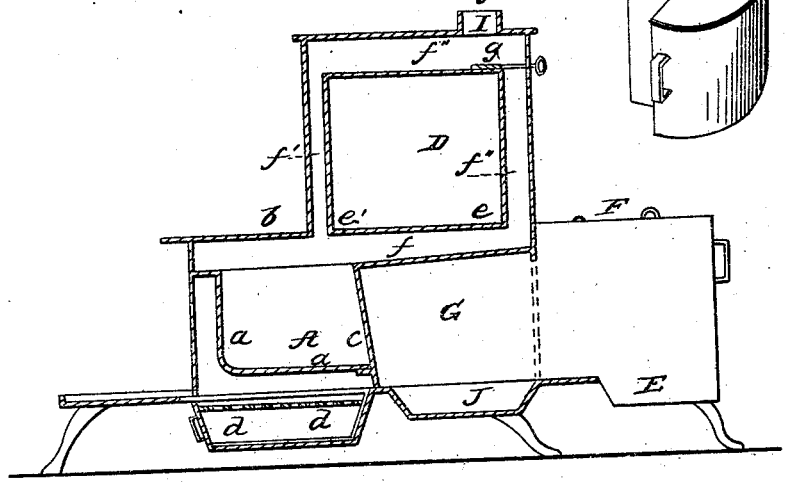

UNITED STATES PATENT OFFICE.

WILLIAM MELSHEIMER, OF PHILADELPHIA, PENNSYLVANIA.

COOKING-STOVE.

Specification of Letters Patent No. 1,911, dated December 19, 1840.

*To all whom it may concern:*

Be it known that I, WILLIAM MELSHEIMER, of the city of Philadelphia, in the State of Pennsylvania, have invented certain improvements in cooking-stoves, which improvements are particularly applicable to the purpose of cooking by means of anthracite; and I do hereby declare that the following is a full and exact description thereof.

My stove contains four ovens, one of which is immediately behind the fire chamber, and this is surmounted by a second oven, which is surrounded by flues on four of its sides; the oven first named has a flue over its top only. The second named oven extends not only over that behind the fire, but in part also over the fire chamber, in a manner to be presently described. The other two ovens are situated at the ends of the fire chamber, their height and width being the same with the height and depth of that compartment.

In the accompanying drawings, Figure 1, is a perspective view of my stove. A, is the fire chamber, which is furnished with a grate for containing anthracite, or other fuel. Above the fire chamber there are openings B, B, for the reception of cooking utensils. C, is one of the side ovens occupying a space at the end of the fire chamber there being a similar oven at the opposite side. D, is the upper oven, surrounded by flues, and extending, as before remarked, in part over the fire chamber. E, E, are openings in the top plate of the fire chamber, to receive boilers, &c. The oven immediately behind the fire, and beneath the oven D, is not furnished with side doors, but is open at the back, where it may be furnished with a door, or shutter; and to it also may be adapted a tin roaster, as shown at F, F.

Fig. 2, shows the back part of the stove, G, G, being the oven, which is represented as left entirely open, in which state it may be used as a heat chamber for a variety of culinary purposes; but when the whole power of the stove is required for cooking, the opening into this compartment may be closed, and it will then become sufficiently heated to roast, or bake, in a very perfect manner. It will be found, also, that roasting may be effectually performed in a tin, reflecting apparatus placed so as to cover the opening.

When the side ovens C, are not used for baking, I adapt boilers to them which, if desired, may be of large capacity. Fig. 3, represents one of these boilers, the part H, being made to fit into the oven, so that its back end shall be in contact with the end plate of the fire chamber.

Fig. 4, is a vertical section of the stove from front to back, through its middle. A, is the fire chamber, $a$, $a$, being the grate for containing the fuel, which is fed in at the place of the boiler openings, $b$, above it. The back plate $c$, of this chamber has an inclination forward, of about an inch, which inclination operates very advantageously in causing the coal and ashes to descend to the lower part of the grate as the combustion goes on; thus preventing their injurious accumulation in this part, and the consequent diminution of the heat. Under the grate, I place an ash-drawer $d$, $d$.

The oven D, has its bottom plate $e$, $e$, overlapping the fire chamber to the distance of three or four inches, as shown at $e'$, which overlapping has not only the effect of enlarging its capacity without increasing the size of the stove, but renders the heat more effective than it can be made without this provision. The flues $f$, $f'$, $f''$, and $f'''$, which surround this oven, I, in general, leave entirely open, so as to allow a free draft immediately from the fire under, and up in front of, the oven. I have ascertained, however, that it is a point of much importance to graduate the size of these flues, more especially those of the front and bottom, and I have found the following proportions to answer well. The front flue $f'$, I make an inch wide; the bottom flue $f$, I make two inches at it smouth, and an inch and a half at its rear end, the flue $f'''$, being also an inch and a half. The top flue $f''$, should not be less than two inches. when there are boiler holes in the top plate. When the flues are thus graduated, and the oven projects over the fire chamber, the heat around it will be equalized without its being necessary to regulate it by dampers; there should, however, be a damper in the stove pipe to govern the general draft. The damper, or shutter which I have shown at $g$, may be used to close the back flue when the oven is not to be heated, and it is desired to direct the draft immediately from the fire to the exit pipe I.

I usually form a sink, or depression, in the bottom plate of the oven G, as shown at J, which increases its height, and serves to hold a dripping pan, or other vessel; it will also be found useful in various ways.

This stove may be varied in size, but I have drawn the section, Fig. 4, to a scale of about an eighth of the actual size of one that I have constructed, and found to answer well in use; it being capable of cooking, when required, for twenty, or thirty, persons, and consuming a very moderate portion of fuel.

Having thus, fully described the manner in which I construct my cooking stove, what I claim therein as constituting my invention, and desire to secure by Letters Patent, is—

1. The manner in which I have arranged and combined the four ovens, as above described; that is to say, there being two ovens, one at each end of the fire chamber; one immediately behind the fire chamber, with a flue passing over the top of it only; and the fourth, or principal, oven situated immediately above this, and extending in part over the fire chamber, as set forth.

2. I also claim the manner of graduating and arranging these flues so as to render their regulation by dampers unnecessary, when the oven is to be heated, said graduation and arrangement being substantially the same with that herein fully made known.

WILLIAM MELSHEIMER.

Witnesse:
J. J. McMULLIN,
JNO. McKENER.